(12) United States Patent
Gandhi et al.

(10) Patent No.: US 10,427,634 B2
(45) Date of Patent: Oct. 1, 2019

(54) AUTOMATICALLY ADJUSTABLE AIRBAG SYSTEM

(71) Applicant: Toyota Motor Engineering & Manufacturing North America, Inc., Erlanger, KY (US)

(72) Inventors: Umesh N. Gandhi, Farmington Hills, MI (US); Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 193 days.

(21) Appl. No.: 15/433,428

(22) Filed: Feb. 15, 2017

(65) Prior Publication Data

US 2018/0201211 A1  Jul. 19, 2018

Related U.S. Application Data

(60) Provisional application No. 62/447,687, filed on Jan. 18, 2017.

(51) Int. Cl.
*B60R 21/01* (2006.01)
*B60R 21/20* (2011.01)
(Continued)

(52) U.S. Cl.
CPC ........ *B60R 21/01* (2013.01); *B60R 21/01512* (2014.10); *B60R 21/217* (2013.01); *B60R 2021/2173* (2013.01)

(58) Field of Classification Search
CPC . B60R 21/01; B60R 21/01512; B60R 21/231; B60R 21/20; B60R 2021/0273; B60R 2021/161
See application file for complete search history.

(56) References Cited

U.S. PATENT DOCUMENTS 5,531,470 A * 7/1996 Townsend .................. B60J 5/06
280/730.2
5,730,458 A * 3/1998 Byon ...................... B60R 19/00
280/730.2
(Continued)

FOREIGN PATENT DOCUMENTS

JP  2008143272 A    6/2008
JP  2011046308 A *  3/2011

OTHER PUBLICATIONS

Espacenet Machine English Translation of JP 2011046308 A, Occupant Crash Protection Device for Vehicle, Mar. 10, 2011, pp. 1-29 (Year: 2011).*

(Continued)

*Primary Examiner* — Jelani A Smith
*Assistant Examiner* — Majdi Alsomiri
(74) *Attorney, Agent, or Firm* — Christopher G. Darrow; Darrow Mustafa PC

(57) ABSTRACT

An adjustable airbag system for a vehicle. The system includes an airbag assembly having an inflatable airbag within a housing, and an airbag housing orientation mechanism operatively coupled to the airbag housing. The airbag housing orientation mechanism is structured to enable control of an orientation of the airbag housing so as to enable deployment of the airbag to cushion an occupant positioned in either one of a driver side or a front passenger side of the vehicle.

23 Claims, 6 Drawing Sheets

(51) Int. Cl.
*B60R 21/231* (2011.01)
*B60R 21/015* (2006.01)
*B60R 21/217* (2011.01)

(56) References Cited

U.S. PATENT DOCUMENTS

| | | | |
|---|---|---|---|
| 7,874,576 B2 | 1/2011 | Gandhi | |
| 8,910,971 B1* | 12/2014 | Faruque | B60R 21/01 |
| | | | 280/728.2 |
| 9,221,418 B1* | 12/2015 | Pline | B60R 21/217 |
| 9,821,746 B1* | 11/2017 | O'Connor | B60R 21/01 |
| 10,081,323 B2* | 9/2018 | Nagasawa | B60R 21/013 |
| 2010/0264629 A1* | 10/2010 | Gandhi | B60R 21/203 |
| | | | 280/728.2 |
| 2014/0183847 A1* | 7/2014 | Rick | B60R 21/205 |
| | | | 280/730.1 |
| 2015/0203065 A1 | 7/2015 | Egusa | |
| 2015/0210237 A1* | 7/2015 | Peterson | B60R 21/01538 |
| | | | 701/45 |
| 2016/0311349 A1* | 10/2016 | Honda | B60N 2/4235 |
| 2017/0088078 A1* | 3/2017 | Nagasawa | B60R 21/013 |

OTHER PUBLICATIONS

Youtube, "Magnetic shape memory alloy actuator", Retrieved from the Internet: <https://www.youtube.com/watch?v=kauMQ3UUZYE&list=PLTxR8zlfzwE7rfXiwS5ap1tcDtVgGnEYZ&index=3>, Published Nov. 24, 2013, 3 pages.
Youtube, "Shape Memory Alloys Actuators (SMA Actuators)", Retrieved from the Internet: <https://www.youtube.com/watch?v=vAU8DM8LaS4>, Published Dec. 20, 2012, 2 pages.

\* cited by examiner

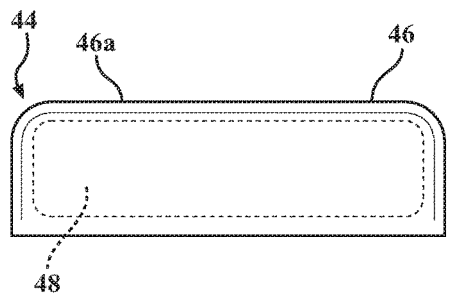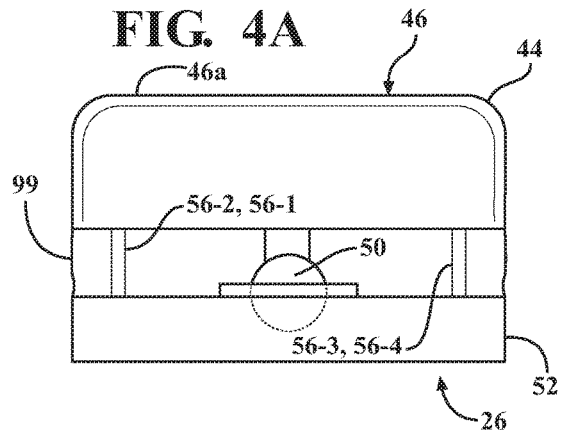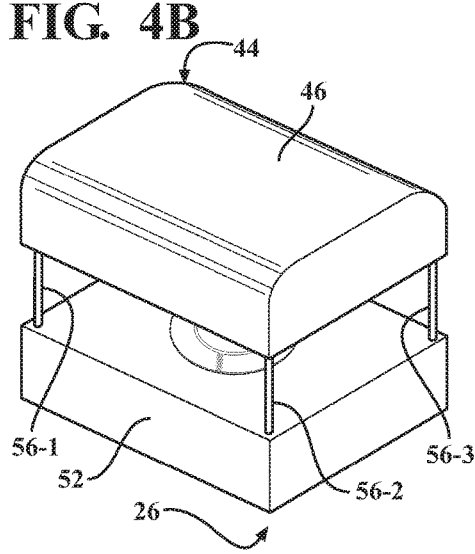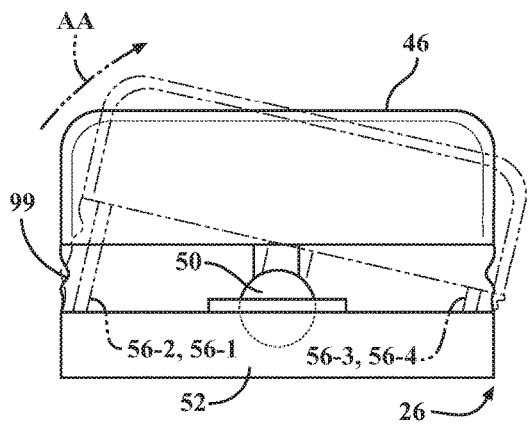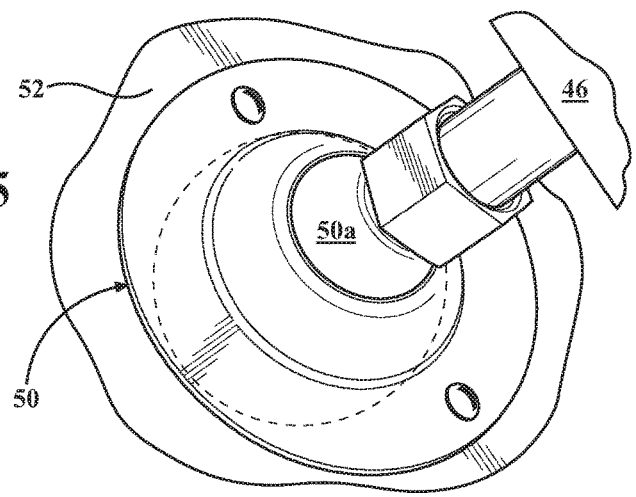

AUTOMATICALLY ADJUSTABLE AIRBAG SYSTEM

CROSS-REFERENCE TO RELATED APPLICATIONS

This application claims benefit of U.S. Provisional Application No. 62/447,687, filed on Jan. 18, 2017, which is herein incorporated by reference in its entirety.

TECHNICAL FIELD

The present invention relates to vehicle occupant protection systems and, more particularly, to vehicle airbag systems.

BACKGROUND

The introduction of autonomous or self-driving vehicles may free vehicle occupants from driving tasks, and may permit the occupant greater freedom to change positions and/or orientation within a seat and within the vehicle. For example, the driver (or passenger) may be leaning to one side within a seat, or the seat may be reclined to a sleeping position for the occupant. However, many vehicle occupant protection systems may be designed primarily to help restrain or cushion an occupant when the occupant is positioned in a predetermined location or has a predetermined orientation (for example, facing toward the front) within the vehicle. Such occupant protection systems may be less effective if the occupant's position and/or orientation deviate from the predetermined coverage parameters of the protection system.

SUMMARY

In one aspect of the embodiments described herein, an adjustable airbag system for a vehicle is provided. The system includes an airbag assembly having an inflatable airbag within an airbag housing, and an airbag housing orientation mechanism operatively coupled to the airbag housing. The airbag housing orientation mechanism is structured to enable control of an orientation of the airbag housing so as to enable deployment of the airbag to cushion an occupant positioned in either one of a driver side or a front passenger side of the vehicle.

In another aspect of the embodiments described herein, an adjustable airbag system for a vehicle is provided. The system includes an airbag housing having an inflatable airbag mounted therein, and an airbag housing orientation mechanism operatively coupled to the airbag housing and structured to enable control of an orientation of the airbag housing. The system also includes an airbag housing positioning mechanism structured to be operatively coupled to a portion of a vehicle. The airbag housing is structured to be coupled to the airbag housing positioning mechanism, and the airbag housing positioning mechanism is operable to move the airbag housing within a space between a driver seat and a front passenger seat.

BRIEF DESCRIPTION OF THE DRAWINGS

FIG. 3 is a schematic side view of an airbag assembly in accordance with an embodiment described herein.

FIG. 4A is a schematic side view of the airbag assembly of FIG. 3 operatively coupled to an airbag housing orientation mechanism.

FIG. 4B is a schematic perspective view of the airbag assembly and airbag housing orientation mechanism of FIG. 4A.

FIG. 4C is a schematic side view of the airbag assembly and airbag housing orientation mechanism of FIG. 4A, showing possible operational modes of the airbag housing orientation mechanism.

FIG. 5 is a schematic perspective view of a connection mechanism in accordance with an embodiment described herein.

DETAILED DESCRIPTION

Embodiments described herein relate to an adjustable airbag system for a vehicle. The adjustable airbag system includes an airbag assembly having an inflatable airbag within an airbag housing, and an airbag housing orientation mechanism operatively coupled to the airbag housing. The system may also include an airbag housing positioning mechanism operatively coupled to the airbag housing. The airbag housing orientation mechanism is operable to adjust an orientation of the airbag housing responsive to measured or calculated vehicle occupant parameters, such as occupant weight, the positions of various portions of the occupant's body, and other parameters. The airbag housing positioning mechanism is operable to adjust a location of the airbag housing for optimal deployment, also based on the vehicle occupant parameters. The airbag housing positioning mechanism may move the airbag housing along an axis positioned between a driver seat and a front passenger seat. The adjustability of the airbag housing orientation and position facilitate deployment of the airbag so as to provide optimal occupant protection for a given position and orientation of the occupant.

Figure 1:
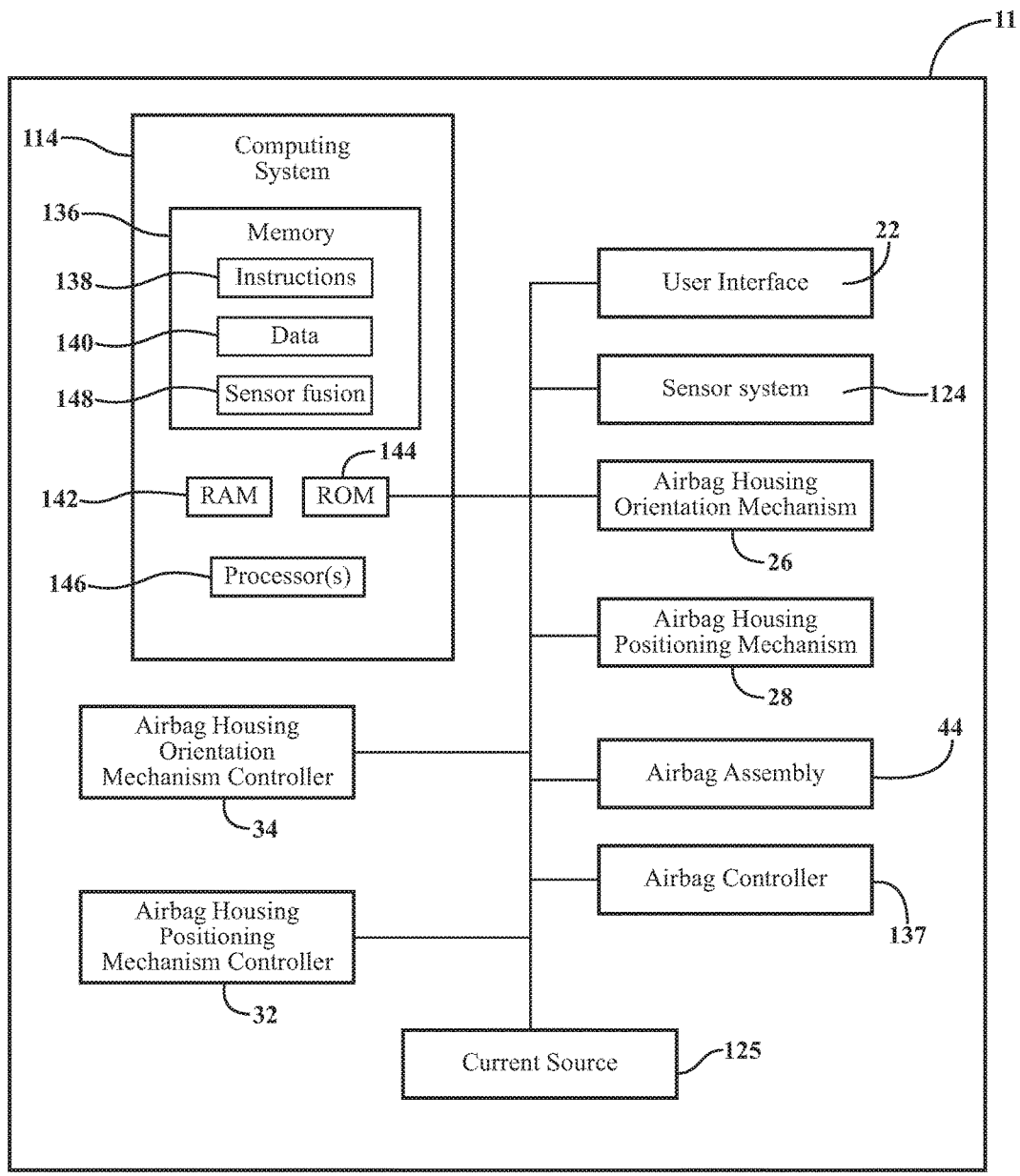
FIG. 1 is a functional block diagram illustrating a vehicle incorporating an adjustable airbag system in accordance with an example embodiment.

FIG. 1 is a functional block diagram illustrating a vehicle 11 incorporating an adjustable airbag system in accordance with an example embodiment. The vehicle 11 may take the form of a car, truck, or other vehicle. The vehicle 11 may be configured to operate fully or partially in an autonomous mode. While in an autonomous mode, the vehicle 11 may be configured to operate without human interaction. For example, the orientation of the airbag assembly 44 may be controlled automatically by heating of shape memory actuators as described herein.

The vehicle 11 may include various systems, subsystems and components in operative communication with each other, such as a sensor system or array 124, a computing system 114, an adjustable airbag system, and other systems and components needed for operating the vehicle as described herein. The vehicle 11 may include more or fewer systems and each system could include multiple elements. Further, each of the systems and elements of vehicle 11 could be interconnected. Thus, one or more of the described functions of the vehicle 11 may be divided up into additional functional or physical components or combined into fewer functional or physical components. In further examples, additional functional and physical components may be added to the examples illustrated by FIG. 1.

Referring to FIG. 1, the adjustable airbag system may include an airbag assembly 44, an airbag housing orientation mechanism 26, and an airbag housing positioning mechanism 28. The adjustable airbag system may also include an airbag housing orientation mechanism controller 34, an airbag housing positioning mechanism controller 32, and additional elements as required.

Referring to FIG. 3, the airbag assembly 44 may include an airbag housing 46 and an inflatable airbag 48 (schematically shown as not being deployed) stowed within the airbag housing. The inflatable airbag 48 may be disposed in or on the airbag housing 46 before it is inflated. The housing 46 may incorporate electronics and other components (not shown) necessary for inflating the inflatable airbag 48. The housing 46 may have a deployment side 46a from which the airbag deploys when activated.

Referring to FIGS. 4A-4C, the airbag housing 46 may be operatively coupled to an airbag housing orientation mechanism 26. Airbag housing orientation mechanism 26 may be configured to enable control of a spatial orientation of the airbag housing 46 for purposes of controlling a deployment direction of the airbag. In one or more arrangements, the orientation mechanism 26 may include a mounting base 52, a connection mechanism (generally designated 50) for rotatably or pivotably connecting the airbag housing 46 to the mounting base 52, and one or more actuators 56, each operatively connecting an associated portion of the airbag housing 46 to the mounting base 52.

Mounting base 52 may provide a base on which the airbag assembly 44 may be mounted. The mounting base 52 may be structured to be coupled to a portion of a vehicle (such as airbag assembly positioning mechanism 28 described herein) so as to be movable within a passenger compartment of the vehicle. Mounting base 52 may have any structure suitable for the purposes described here and may be formed from any suitable material (for example, a metallic or polymer material).

The connection mechanism 50 may be any mechanism structured to permit pivoting or rotating of the airbag housing 46 with respect to the mounting base 52, so as to enable adjustment of the airbag housing orientation as described herein. In one or more arrangements, the connection mechanism 50 is in the form of a ball joint, as shown in FIG. 5. Such a joint retains the airbag housing 46 to the mounting base 52 and also may enable rapid and flexible reorientation of the airbag housing 46 responsive to forces exerted by the actuators 56, as described below.

In one or more arrangements, a ball 50a of the ball joint 50 may be mounted in the mounting base 52 as shown in FIG. 5, so as to swivel within the mounting base. In other arrangements, the ball 50a of the ball joint 50 may be mounted in the airbag housing 46 so as to swivel within the airbag housing. Other types of mechanisms may also be used, provided they enable the reorientation of the airbag housing 46 by the actuators 56 according to the requirements of a particular application.

Each actuator 56 connects to an associated portion of the airbag housing 46 to the mounting base 52, and is operable to control a distance between the associated portion of the airbag housing and the mounting base 52. A housing 46 which is generally rectangular in shape may have an actuator positioned proximate each corner. Using such an actuator arrangement, the orientation of the housing 46 may be adjusted with respect to two perpendicular axes. In one or more arrangements, the actuators 56 may be in the form of shape memory alloy (SMA) springs. The springs may be coil springs, or the springs may have one or more alternative shapes.

The airbag housing orientation mechanism 26 may be structured to control the orientation of the airbag housing 46 by controlling the distances of associated portions of the airbag housing from the mounting base 52 using the actuators 56. A desired housing orientation may be achieved by controlling the temperatures of the SMA actuators as described herein.

FIGS. 4A-4C are schematic views showing an embodiment where the actuators 56 are in the form of SMA springs. FIGS. 4A-4C show an airbag assembly 44 connected to a mounting base 52 by four SMA springs 56-1, 56-2, 56-3, and 56-4 (not shown), with an end of each spring attached to the airbag housing 54 proximate an associated corner of the housing. Although FIGS. 4A-4C show an embodiment where four actuators are employed, a different number of actuators may be used if desired.

In one or more arrangements, the springs may be coil springs formed from an SMA material. Each of the springs may have an associated length when the spring is in its normal or undeflected state. The springs may be stretched in a known manner when at a temperature (for example, room temperature or about 25° C.) within a certain operating temperature range. The springs may be fabricated in a known manner such that the springs at their deformed lengths return to their associated normal lengths when the springs are heated to a temperature above the transformation temperature of the shape memory alloy used. The springs may be heated by an external heating source, or the springs may be heated internally by passing electric currents through the springs.

The one or more of the springs 56-1 through 56-4 may also exhibit superelastic properties wherein, when the spring(s) are heated to a temperature within a narrow predetermined range (i.e., the superelastic temperature range) above the transformation temperature, the SMA material exhibits a greatly magnified elasticity, enabling the material to be stretched to a much greater extent than would normally be the case.

FIG. 4A is an end view of an airbag assembly 44 in a neutral or 0° orientation, with each of the springs 56-1 through 56-4 in a stretched state designed to maintain the airbag assembly in the orientation shown. FIG. 4B is a perspective view of the embodiment shown in FIG. 4A. FIG. 4C is the end view of FIG.4A showing a possible change in orientation of the airbag housing 54 resulting from operation (i.e., temperature adjustment) of the actuating springs 56-1 through 56-4. In the neutral orientation shown in FIG. 4A, a deployment side 46a of the airbag housing 46 faces vertically upward or substantially vertically upward (i.e., with no bias toward either the driver side or the front seat passenger side). The deployment side 46*a* is a side of the airbag housing from which the airbag will deploy.

If desired, a shroud 99 may be provided to extend between the mounting base 52 and the airbag housing 46, for enclosing the springs 56-1 through 56-4 and the connection mechanism 50 to aid in protecting the springs and the connection mechanism 50 from damage and debris. The shroud may be flexible and expandable to accommodate motion of the airbag housing 46 with respect to the mounting base 52. In one example, a rubber or fabric bellows structure may be used.

In one operational mode, each of the springs 56-1 through 56-4 may be connected to the mounting base and the airbag housing so that the springs are stretched elastically (i.e., to a length dimension where linearity of the force-deflection characteristics is maintained). In this state, each spring will be in tension and will exert a corresponding force on a corner of the airbag housing 46 tending to pull a portion of the airbag housing 46 toward the mounting base 52. The airbag housing 46 may be spaced apart from the mounting base 52 and maintained at a suitable distance from the mounting base 52 by the connecting joint 50, so as to stretch the springs 56-1 through 56-4 by a desired amount when the airbag housing is in the neutral orientation. The forces exerted by springs 56-1 through 56-4 may be balanced to have the same force-deflection characteristics and extensions so that the airbag housing remains in the neutral orientation shown in FIG. 4A until one or more of the springs are actuated. The springs 56-1 through 56-4 may be actuated by operating the current source 125 to control the temperatures of the springs, so as to utilize the SMA properties of the springs to achieve a desired effect on airbag housing orientation.

In one example of an adjustment of the airbag housing orientation, springs along one side of the airbag housing may be heated to a temperature within the superelastic range, while springs on the opposite side are unheated. Referring to FIGS. 4A-4C, for example, the orientation of the housing 46 may be changed by heating springs 56-1 and 56-2 to temperatures within the superelastic temperature ranges of their SMA materials. The springs 56-1 and 56-2 may be heated by a suitable current flow through the springs. This allows the springs 56-1 and 56-2 to stretch responsive to tension forces in the stretched springs 56-3 and 56-4 on the opposite side of the airbag housing 46. As a result, the airbag housing 46 rotates on ball joint 50 in direction AA of FIG. 4C, thus changing the orientation of the airbag housing 46. In one example, the new orientation shown in FIG. 4C may be an orientation wherein a deployment side 46*a* of the housing (i.e., a side from which the airbag will deploy) is facing toward a driver. To tilt the airbag housing in an opposite direction (i.e., toward the front seat passenger side), the process just described may be reversed by heating springs 56-3 and 56-4 and leaving springs 56-1 and 56-2 unheated.

In another operational mode, all of the springs 56-1 through 56-4 may be connected to the mounting base 52 and the airbag housing 46 so that the springs are stretched elastically. In this state, each spring will be in tension and will exert a corresponding force on a corner of the airbag housing 46 tending to pull a portion of the airbag housing toward the mounting base 52. The airbag housing 46 may be spaced apart from the mounting base 52 and maintained at a suitable distance from the mounting base 52 by the connecting joint 50, so as to stretch the springs 56-1 through 56-4 by a desired amount when the airbag housing is in the neutral orientation. The forces exerted by springs 56-1 through 56-4 may be balanced to have the same force-deflection characteristics and extensions so that the airbag housing remains in the neutral orientation shown in FIG. 4A until one or more of the springs are actuated.

Also, in this operational mode, springs along one side of the airbag housing 46 may be heated to a temperature above the transformation temperature of the SMA materials and also outside the superelastic range of the SMA material, while springs on the opposite side are unheated. Referring to FIGS. 4A-4C, for example, the orientation of the housing 46 may be changed by heating springs 56-3 and 56-4 to temperatures above the transformation temperature of the SMA materials and also outside the superelastic range of the SMA materials. This heating will cause the springs 56-3 and 56-4 to attempt to contract to their original, undeflected lengths. The springs 56-3 and 56-4 may be heated by a suitable current flow through the springs. This causes the unheated springs 56-1 and 56-2 to stretch responsive to the forces exerted by the heated springs 56-3 and 56-4 on the opposite side of the airbag housing 46. As a result, the airbag housing 46 rotates on ball joint 50 in direction AA of FIG. 4C, thus changing the orientation of the airbag housing. In one example, the new orientation shown in FIG. 4C may be an orientation wherein a deployment side 46*a* of the housing (i.e., a side from which the airbag will deploy) is facing toward a driver. To tilt the airbag housing in an opposite direction (i.e., toward the front seat passenger side), the process just described may be reversed by heating springs 56-1 and 56-2 as described and leaving springs 56-3 and 56-4 unheated.

In yet another operational mode, all of the springs 56-1 through 56-4 may be connected to the mounting base and the airbag housing so that the springs are stretched elastically. In this state, each spring will be in tension and will exert a corresponding force on a corresponding corner of the airbag housing tending to pull a portion of the airbag housing toward the mounting base. The airbag housing 46 may be spaced apart from the mounting base 52 and maintained at a suitable distance from the mounting base by the connecting joint 50, so as to stretch the springs 56-1 through 56-4 by a desired amount when the airbag housing is in the neutral orientation. The forces exerted by springs 56-1 through 56-4 may be balanced to have the same force-deflection characteristics and extensions so that the airbag housing remains in the neutral orientation shown in FIG. 4A until one or more of the springs are actuated.

In this operational mode, each spring along one side of the airbag housing may be heated to a temperature within the superelastic range, while each spring on the opposite side may be heated to a temperature above the transformation temperature of the SMA materials and also outside the superelastic range of the SMA material. Referring to FIGS. 4A-4C, for example, the orientation of the housing 46 may be changed by heating springs 56-1 and 56-2 to temperatures within the superelastic temperature ranges of their SMA materials. The springs 56-1 and 56-2 may be heated by a suitable current flow through the springs. At the same time, the springs 56-3 and 56-4 on the opposite side of the airbag housing 46 may be heated to temperatures above the transformation temperature of the SMA materials and also outside the superelastic range of the SMA materials. This heating will cause the springs 56-3 and 56-4 to attempt to contract to their original, undeflected lengths. This coordinated heating of the springs allows the springs 56-1 and 56-2 to stretch superelastically responsive to the forces tending to contract the springs 56-3 and 56-4 on the opposite side of the airbag housing 46. As a result, the airbag housing 46 rotates on ball joint 50 in direction AA of FIG. 4C, thus changing the orientation of the airbag housing. This operational mode may tilt the airbag housing to a greater degree than the operational modes previously described because the forces tending to contract the springs due to heating may be greater than contraction forces due to conventional stretching alone.

In one example, the new orientation shown in FIG. 4C may be an orientation wherein a deployment side 46a of the housing (i.e., a side from which the airbag will deploy) is facing toward a driver. To tilt the airbag housing in an opposite direction (i.e., toward the front seat passenger side), the process just described may be reversed by heating springs 56-3 and 56-4 to temperatures within the superelastic range, and heating springs 56-1 and 56-2 to temperatures above the transformation temperature of the SMA materials and also outside the superelastic range of the SMA materials.

To return the airbag housing 46 to the neutral orientation shown in FIG. 4A, the current flow through the springs 56-1 through 56-4 may be adjusted to heat the springs to temperatures above the transformation temperature of the SMA materials and also outside the superelastic range of the SMA materials. This may cause the springs to attempt to shrink or contract to their undeflected lengths until the contracting forces at the corners of the airbag housing balance each other. At this point, the airbag housing should be in, or close to, the neutral orientation.

The operational modes just described enable adjustment of the airbag housing orientation with respect to the mounting base 52. Other operational modes and arrangements are also possible. For example, in alternative operational modes, the temperatures of individual ones of springs 56-1 through 56-4 may be controlled as described so as to adjust the distances between associated corners of the airbag housing 46 and the mounting base 52, thereby changing the orientation of the airbag housing 46 in a desired manner. For example, spring 56-3 may be heated so as to cause the spring to contract thereby forcing a first corner of the housing 46 toward the mounting base. simultaneously, a spring 56-1 located at an opposite corner of the airbag housing may be heated or left at ambient temperature so as to increase the distance of the opposite corner from the mounting base 52. This may result in the airbag housing corner coupled to spring 56-3 being relatively lower than the corners coupled to springs 56-1, 56-2, and 56-4, thereby producing a desired tilt of the airbag housing 46. Thus, in the manner described, the temperatures of one or more of springs 56-1 through 56-4 may be cooperatively controlled to produce a desired orientation of the airbag housing. For other operational modes, one or more of the springs may alternatively be arranged such that the deformed lengths of the springs are less than their associated normal lengths, and such that the springs increase in length from their deformed lengths when the springs are heated to temperatures above the transformation temperature.

SMA materials usable in SMA-based actuators may include, without limitation, copper-zinc-aluminum-nickel alloys, copper-aluminum-nickel alloys, and nickel-titanium alloys. However, it will be understood that other SMA materials may be used for the actuators, including those known presently in the art and those yet to be developed. In one embodiment, one or more of the SMA actuators may comprise an alloy of nickel-titanium, such as Nitinol. When no electrical current is applied, each of the actuators may assume an associated first length or configuration. However, when an electrical current is applied to the actuator to heat the actuator, the actuator may assume a second, different length or configuration. This change in length or configuration may result in a change in the orientation of the airbag housing as described herein.

The values of pertinent parameters needed to achieve the desired adjustability of the airbag housing orientation may be determined analytically or through experimentation, using known methods. Pertinent parameters may depend on the requirements of a particular vehicle design or application, and may include the masses and undeflected lengths of the springs, the force-deflection characteristics of the springs, characteristics of the particular shape memory alloy(s) to be used, the spacing between the airbag housing and the mounting base needed to allow the housing rotation necessary to achieve a desired housing orientation, the superelastic temperature range(s) of the SMA material(s), and other factors.

In alternative embodiments, SMA wires, other types of SMA springs, or other types of actuators may be used. For example, electro-mechanical actuators may be used to adjust the orientation of the airbag housing. Such actuators may include (but are not limited to) electrical motors and solenoids. When the actuator comprises an electrical motor, gears, rack and pinions, or other such devices may be employed to facilitate the adjustment of the airbag housing orientation. When the actuator comprises a solenoid, the solenoid may be able to adjust the orientation of the housing to two or more discrete orientations. In either case, the electro-mechanical actuator may be mechanically coupled to the mounting base 52 as well as the airbag housing 46. Numerous embodiments using electro-mechanical actuators are possible.

Although the disclosed embodiments of the actuator include SMA actuators and electro-mechanical actuators, it is contemplated that other types of actuators may also be used to adjust the orientation of the airbag housing, including yet-to-be-discovered actuators. Consequently, any of these actuators may be used to adjust the orientation of the airbag housing as described herein. Furthermore, various combinations of different actuators may be used to adjust the orientation of the airbag housing. For example, in one embodiment, the system may include both an electro-mechanical actuator and an SMA actuator. In such a system, the electro-mechanical actuator may provide a coarse (or fine) position adjustment, while the SMA actuator may provide a fine (or coarse) position adjustment.

In the embodiment shown in FIGS. 4A-4C, an actuator connects the airbag housing 46 to the mounting base 52 proximate each corner of the airbag housing. However, one or more of the actuators 56 may be connected to the mounting base 52 and/or the airbag housing 46 at any of a variety of alternative locations, according to the requirements of a particular application. For example, one or more of the actuators may be located closer to the connecting joint 50. The locations of the connections of the actuators 56 to the airbag housing 46 and mounting base 52 may be varied according to such factors as the type of actuator used, the amount of rotation desired for the airbag housing, space constraints, the amount of force that may be generated by a particular actuator at a particular location, and other pertinent factors.

In one or more arrangements, the deployment direction of the airbag 48 may be adjusted using by the airbag housing orientation mechanism 26 and/or the airbag housing positioning mechanism 28 to achieve a preferred or optimum deployment position and direction of the airbag for a particular passenger and situation.

An airbag housing orientation mechanism controller 34 may be in operative communication with the airbag housing orientation mechanism 26, at least one of sensors 124, and other portions of the vehicle 11. The controller 34 may be configured for operating the airbag housing orientation mechanism 26 to control an orientation of the airbag housing 46 for airbag deployment, responsive to a measurement of a least one vehicle occupant parameter and prior to deployment of the airbag as described herein.

The airbag housing orientation mechanism controller 34 may be configured to generate signals controlling operation of the actuators 56 connecting the airbag housing 46 with the mounting base. The actuators 56 may be controlled as previously described so as to adjust the orientation of the airbag housing 46 with respect to the mounting base 52. For example, in an embodiment using SMA springs, the controller 34 may operate the current source 125 to control the individual electric current flowing through each actuator 56. The airbag housing orientation mechanism controller 34 may be in communication with at least one of sensors 124. The airbag housing orientation mechanism controller control commands may be generated responsive to information received from one or more sensors of sensor system 124 relating to the position and/or orientation of a vehicle occupant, the position and/or orientation of a portion of the occupant's body, or other vehicle occupant parameters as described herein.

Functions of the various dedicated controllers (such as airbag housing orientation mechanism controller 34 and airbag housing positioning mechanism controller 32) described herein may be incorporated into a single controller configured for performing the functions described. Also, controllers 32 and 34 may be configured to communicate with each other and also with vehicle computing system 114. Alternatively, the vehicle computing system 114 may be configured to perform the functions of one or more of the dedicated controllers described herein.

An airbag housing positioning mechanism 28 may be structured to be operatively coupled to a portion of the vehicle. The airbag housing positioning mechanism 28 may be configured to move the airbag housing into what is determined to be an optimum position for airbag deployment. The airbag housing positioning mechanism 28 may be operable to move the airbag housing 46 within a space between a driver seat and a front passenger seat. In one or more arrangements, the airbag housing positioning mechanism 28 may be structured to move the airbag housing 46 into the optimum deployment position by moving the airbag housing orientation mechanism to which the airbag housing is operatively coupled as described herein. The deployment position may be a position lying along a horizontal plane H1 along which the mounting base 52 may travel during movement by the airbag housing positioning mechanism.

The airbag housing positioning mechanism 28 may be mounted on or incorporated into a mounting structure 129. In one or more arrangements, the mounting structure 129 may be a floor of the vehicle between the driver and front passenger seats. In other arrangements (and as shown in the drawings), the mounting structure may be a center console located between the driver and front passenger seats.

Figure 6:
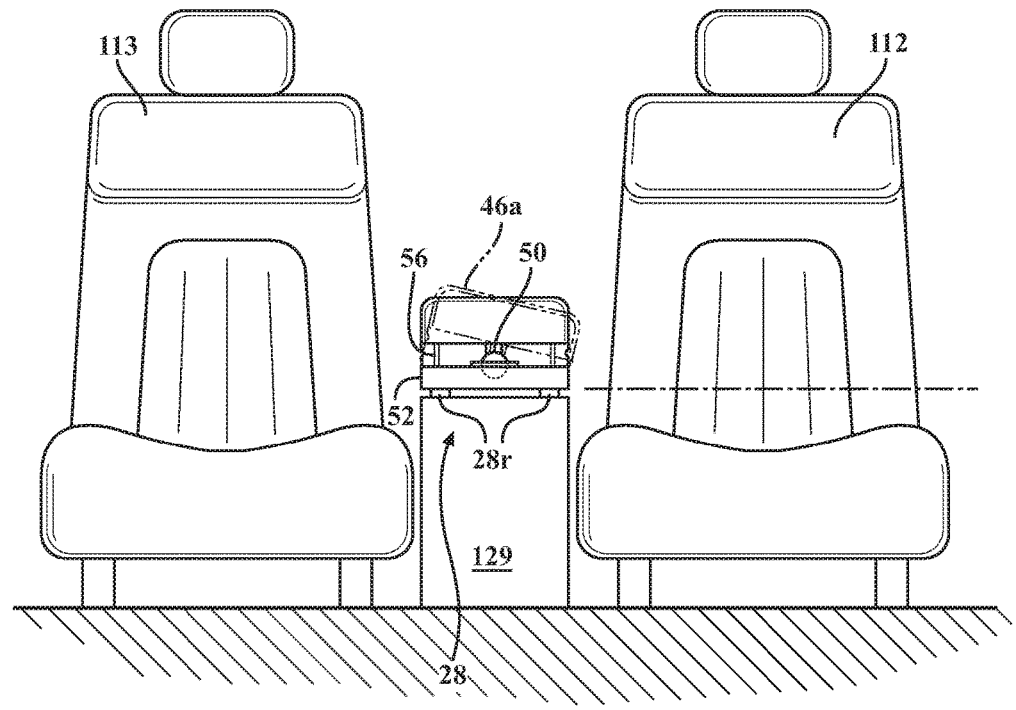
FIG. 6 is a schematic front view of an airbag housing positioning mechanism in accordance with an embodiment described herein.

In one or more arrangements, the airbag housing positioning mechanism 28 may be operable to move the airbag assembly 44 in directions parallel to a fore-aft axis FA1 of a vehicle. Referring to FIG. 6, in one example, the airbag housing positioning mechanism 28 may include one or more rails 28r mounted on the mounting structure 129. The rails 28r may be oriented so as to guide the airbag assembly 44 and its associated airbag housing orientation mechanism 26 in directions parallel to the fore-aft axis FA1 of the vehicle. This embodiment of the positioning mechanism 28 may also include any motors, gears, linear actuators, etc., which may be operatively connected to the airbag housing orientation mechanism 26 or the airbag assembly 44, for purposes of moving the airbag housing orientation mechanism 26 or the airbag assembly 44 along the mounting structure 28a. The airbag housing orientation mechanism 26 and/or the airbag assembly 44 may be mounted to the rails 28c and automatically moved along the rails responsive to control commands from the airbag housing positioning mechanism controller 32 or computing system 114.

Figure 7:
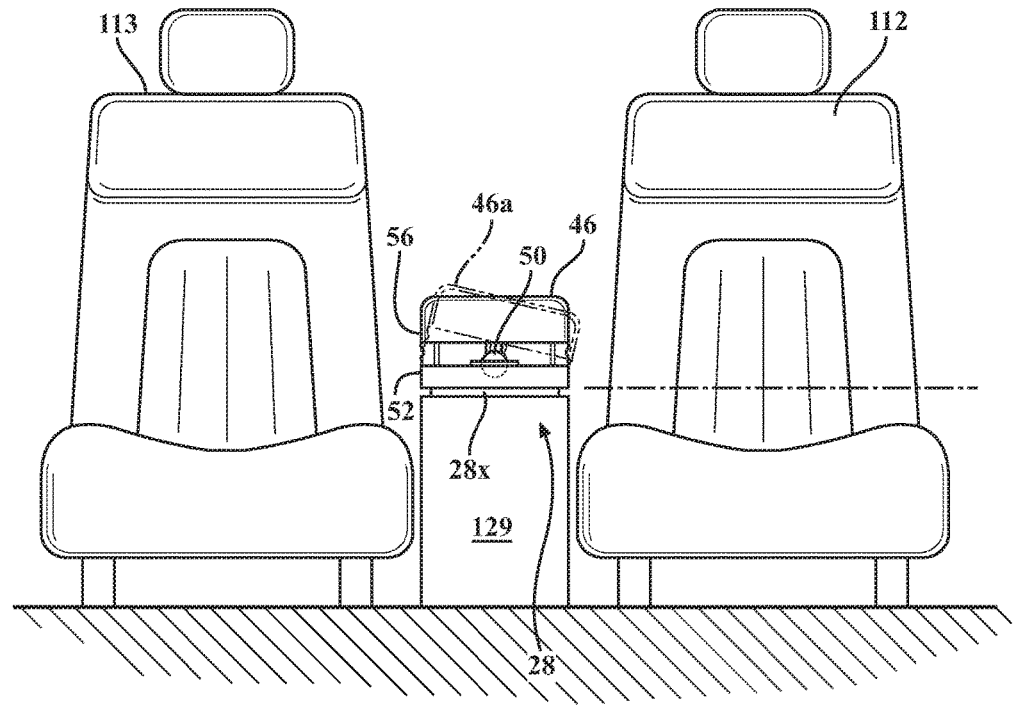
FIG. 7 is a schematic front view of an airbag housing positioning mechanism in accordance with another embodiment described herein.

In one or more arrangements, the airbag housing positioning mechanism 28 may be structured to be operable to move the airbag assembly 44 in directions parallel to the fore-aft axis FA1 of the vehicle, and also in directions perpendicular to the fore-aft axis of the vehicle. Referring to FIG. 7, in one example, the airbag housing positioning mechanism 28 may include an x-y positioning stage 28x located between the driver seat 112 and the front passenger seat 113. The airbag housing orientation mechanism 26 or the airbag assembly 44 may be mounted to the x-y positioning stage 28x and automatically moved to locations along the plane H1 by the positioning stage responsive to control commands from the airbag housing positioning mechanism controller 32 or computing system 114.

An airbag housing positioning mechanism controller 32 may be in operative communication with the airbag housing positioning mechanism 28, at least one of sensors 124, and other portions of the vehicle. The controller 32 may be configured for operating the airbag housing positioning mechanism 28 to move the mounting base 52 to a desired position for deployment of the airbag, responsive to a measurement of at least one vehicle occupant parameter and prior to deployment of the airbag as described herein.

The computing system 114 may be operatively connected to the other vehicle systems and elements and may be configured so as to control and operate the vehicle 11 and its components as described herein. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may additionally or alternatively include components other than those shown and described. The computing system 114 may control the functioning of the vehicle 11 based on inputs and/or information received from various sensors of the sensor system 124 and other information.

FIG. 1 illustrates a block diagram of an exemplary computing system 114 according to one or more illustrative embodiments of the disclosure. The computing system 114 may have some or all of the elements shown in FIG. 1. In addition, the computing system 114 may include additional components as needed or desired for particular applications. The computing system 114 may also represent or be embodied in a plurality of controllers or computing devices that may process information and/or serve to control individual components or systems of the vehicle 11 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 11. For instance, the processor(s) 146 can be part of an electronic control unit (ECU) and can act as a controller in the vehicle 11.

In one or more arrangements, the computing system 114 may include RAM 142, ROM 144, and/or any other suitable form of computer-readable memory. The memory 136 may comprise one or more computer-readable memories. Computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 140 and/or instructions 138 (e.g., program logic) executable by the processor(s) 146 to execute various functions of the vehicle 11. The memory 136 may contain additional instructions as well, including instructions to transmit data to, receive data from, interact with, or control one or more of the vehicle systems and/or components described herein (for example, the adjustable airbag system).

The vehicle 11 may include a current source 125 operatively connected to computing system 114, to airbag housing orientation mechanism controller 34, to multiple shape memory alloy (SMA) actuators (described in greater detail below) provided for adjusting the orientation of the airbag assembly, and/or to other systems or elements of the vehicle 11 as needed. Current source 125 may be configured to provide a separate current to each individual SMA actuator, for controlling the temperature of each actuator independently of the other actuators.

Current source 125 may be controllable by the computing system 114 or by a dedicated controller (such as an airbag housing orientation mechanism controller 34, shown in FIG. 1) to provide a separate current to each individual SMA actuator, for controlling the temperature of each actuator independently of the other actuators. The current to each actuator may be tailored to the heating requirements of the given actuator according to one or more vehicle occupant parameters as determined by the sensor system 124 and computing system 114, and as described herein.

The vehicle may include an airbag controller 137 in operative communication with airbag assembly 44, computing system 114, sensor system 124, and other elements of the vehicle as required. Airbag controller 137 may be configured to control deployment of the various vehicle airbags (including the airbag mounted in airbag assembly 44) responsive to information received from the sensor system, 124, computing system 114, and other sources. In one or more arrangements, the airbag controller 137 or its functions may be incorporated into computing system 114.

Sensors of the vehicle sensor system 124 may be in operative communication with computing system 114, controllers 32 and 34, and other vehicle systems. In a known manner, the sensor system 124 includes sensors configured to provide data usable by the computing system 114 and controllers 32, 34 in formulating and executing suitable control commands for the various vehicle systems. In arrangements in which the sensor system 124 includes a plurality of sensors, the sensors can work independently from each other. Alternatively, two or more of the sensors can work in combination with each other.

Figure 2:
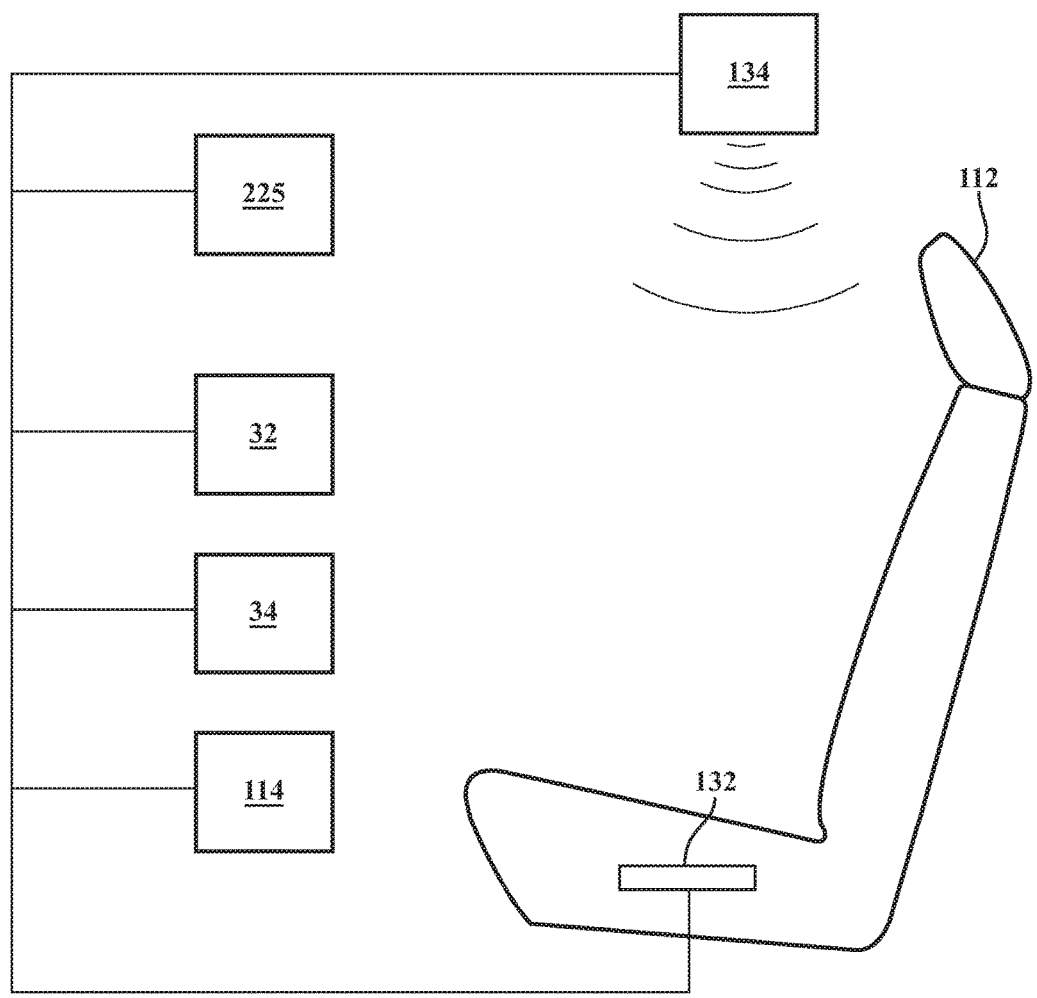
FIG. 2 is a schematic block diagram showing one embodiment of a sensor arrangement configured for measuring one or more vehicle occupant parameters.

Sensor system 124 may include one or more sensors configured to measure at least one vehicle occupant parameter. Sensors 124 may also be operable to obtain data which may be used (by the pertinent sensors and/or in conjunction with computing system 114 and/or controllers 32 and 34) to determine values for various vehicle occupant parameters relating to an occupant of the vehicle. The vehicle occupant parameters may include occupant weight, height, locations (and/or relative locations) of the occupant's head, torso, or other body portion, a direction in which the occupant is leaning, and other parameters. Because these parameters may change unpredictably and relatively rapidly, the sensors 124 and the computing system 114 may continuously gather and process data relating to the parameters, so that the vehicle occupant parameter values may be updated as rapidly as possible. The sensors 124 may provide signals representing vehicle occupant parameters to the computing system 114 and/or to a controller (such as one of controllers 32 and 34 described herein). For example, a seat-mounted weight sensor 132 as shown in FIG. 2 may send a signal representing the weight of an occupant of the vehicle to the computing system 114 or to a controller.

The vehicle 11 may incorporate one or more body portion positional sensors. The body portion positional sensors may be disposed in the roof of the vehicle and/or in other suitable locations. Referring to FIG. 2, in one example, a body portion positional sensor is in the form of an ultrasonic or other type of sensor 134 configured to measure a distance of the occupant's head from respect to the sensor, and which may also measure a direction of the occupant's head with respect to the sensor. The sensor may alternatively gather data from which these parameters may be determined. The sensor 134 may send a signal to the computing system 114 or to controllers 32, 34 containing the gathered information or any parameter value determined. In other embodiments, the body portion positional sensor 134 may be a capacitive or laser sensor.

Another type of body portion positional sensor may be in the form of one or more cameras (generally designated 225) mounted in the passenger compartment. The cameras may be configured for detecting (or for providing information usable by the computing system 114 or a controller for determining) the position of an occupant (or the position of a particular portion of the body of an occupant) within the passenger compartment, an occupant orientation (for example, whether the occupant and/or the occupant's seat is facing to the right or left, or whether the occupant is reclined or seated upright in the seat), the occupant's height, and other parameters. For example, the cameras(s) 225 may provide information enabling detection of a condition in which an occupant's head resides outside a predetermined zone or volume related to the seat. The computing system 114 or a controller may be configured to control the temperature of one or more SMA actuators to adjust the airbag housing orientation based on whether the occupant's head resides within the predetermined zone. The cameras 225 may also be configured to provide information (relating, for example, to the relative positions of the head and torso of the occupant) from which an orientation of the occupant may be estimated. For example, the camera data may be usable to determine in which direction the occupant is leaning while seated in the seat.

Those skilled in the art may recognize that additional types of sensors may also be used, either alone or in combination with the sensors described. In addition, the computing system 114 or controllers 32, 34 may use information received from any combination of sensors in sensor system 124 and also information from any other source in determining the values of the Vehicle occupant parameters. The computing system 114 or a controller may use information received from any combination of sensors in sensor system 124 and also information from any other source in determining whether the temperature that a given SMA actuator should be adjusted for a particular set of conditions.

Sensor system 124 may also include one or more pre-collision or pre-crash sensors configured to alert the computing system to vehicle external conditions which indicate that a collision is imminent or probable. The pre-collision sensor(s) may include radar-based sensors, laser-based sensors, cameras, or any other suitable sensors.

In certain embodiments, one or of sensors 124 may incorporate a level of data processing capability as well as data gathering capability. This may enable the sensor to process data gathered by the sensor to determine a value or state of a vehicle occupant parameter. In cases where the parameter value may represent a trigger condition for controlling the temperature of one or more SMA actuators, the parameter value may be passed to the computing system 114 or to a suitable controller. The computing system 114 or a controller may then generate and transmit a suitable command for controlling the temperature of the one or more SMA actuators. In other embodiments, the sensor may gather data and pass the data to the computing system 114 or to a controller for analysis and interpretation.

Embodiments of the adjustable airbag system described herein may be configured to operate as described herein to automatically adjust the position and orientation of the airbag housing 46 according to the position, orientation, and other parameters relating to a predetermined vehicle occupant. Information used to determine vehicle occupant parameters may be continuously gathered and processed as rapidly as possible, so that responsive control commands may be generated by the computing system and/or airbag housing positioning mechanism controller 32 and airbag housing orientation mechanism controller 34, and transmitted to the airbag housing positioning mechanism 28 and airbag housing orientation mechanism 26. The generated commands may be used to control orientation and positioning of the housing, as described herein. The position and orientation of the airbag housing 46 may be automatically and continuously adjusted based on information received from sensors 124 and/or from any other source. The use of "continuously" when referring to the reception, gathering, monitoring, processing, and/or determination of any information or vehicle occupant parameters described herein means that the computing system 114 and/or controllers 32, 34 may be configured to receive and/or process any information relating to these parameters as soon as the information exists or is detected, or as soon as possible in accordance with sensor acquisition and processor processing cycles.

In one or more arrangements, the airbag housing orientation mechanism 26 may be structured to enable control of an orientation of the airbag housing 46 so as to enable deployment of the airbag to cushion an occupant positioned in either one of a driver side or a front passenger side of a vehicle.

For example, referring to FIGS. 6 and 7, the airbag housing orientation mechanism 26 may be controlled by a user so as to maintain a tilt of the airbag housing 46 toward either one of the driver side or the front passenger side of a vehicle, responsive to a selection by a vehicle occupant. The occupant may select a preferred deployment side of the airbag 48 using a suitably configured user interface 22 which may be operatively to the computing system, to one or more of controllers 32, 34, and to other elements of the vehicle. User interface 22 may be in the form of a touch screen configured to receive vehicle related commands from an occupant, for example. After occupant selection of a preferred deployment side, the adjustable airbag system may automatically operate to adjust to the changing movements and orientations of the occupant seated on the preferred side, so as to position and orient the airbag housing 46 in an optimal location for airbag deployment, prior to deployment of the airbag.

Figure 9:
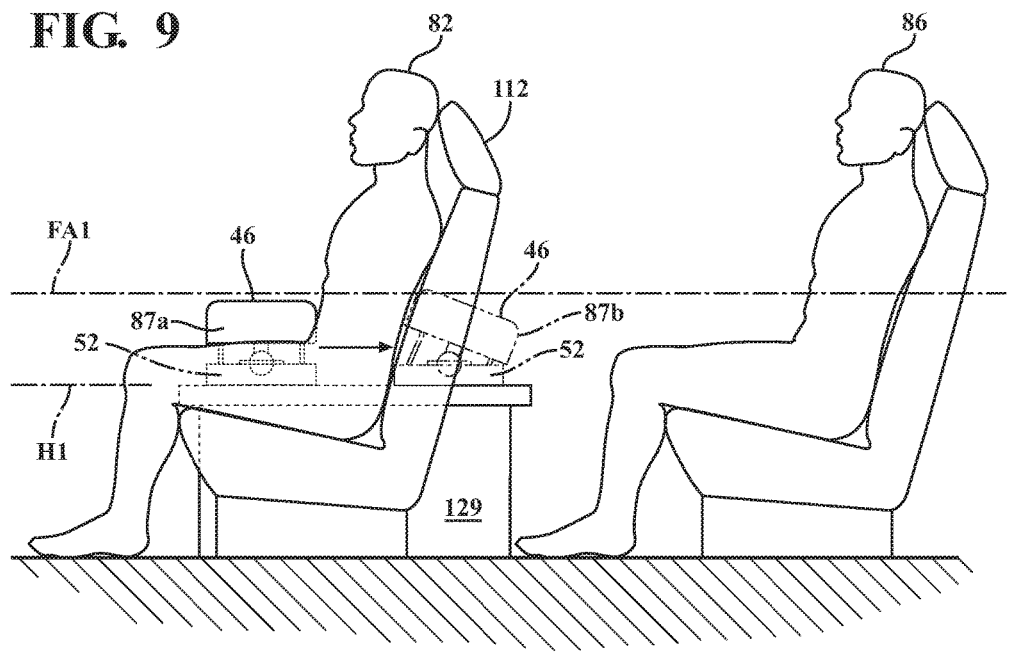
FIG. 9 is a schematic side view of an adjustable airbag system including an airbag housing positioning mechanism and an airbag housing orientation mechanism configured to facilitate deployment of an airbag to cushion an occupant of a rear vehicle seat.

Referring to FIG. 9, in one or more arrangements, the mounting structure 129 and the airbag housing positioning mechanism 28 are structured to enable the mounting base 52 and the attached airbag housing 46 to move to a location where the airbag 48 may be deployed to cushion an occupant 86 of a rear vehicle seat. This deployment mode may be selected using the user interface as previously described.

For example, after selection of the rear seat occupant 86 as the passenger to be cushioned by the airbag 48, the adjustable airbag system may be automatically controlled by the computing system and/or the controllers 32, 34 to position and orient the airbag housing 46 for optimal deployment of the airbag, to cushion rear seat occupant 86. The airbag housing positioning mechanism 28 may be controlled so as to move the mounting base 52 and airbag housing 46 from a first location 87a to a second location 87b, proximate the rear seat occupant 86. The airbag housing orientation mechanism 26 may be controlled so as to optimally adjust a tilt of the airbag housing 46 toward the rear seat occupant 86, based on vehicle occupant parameters.

Figure 8:
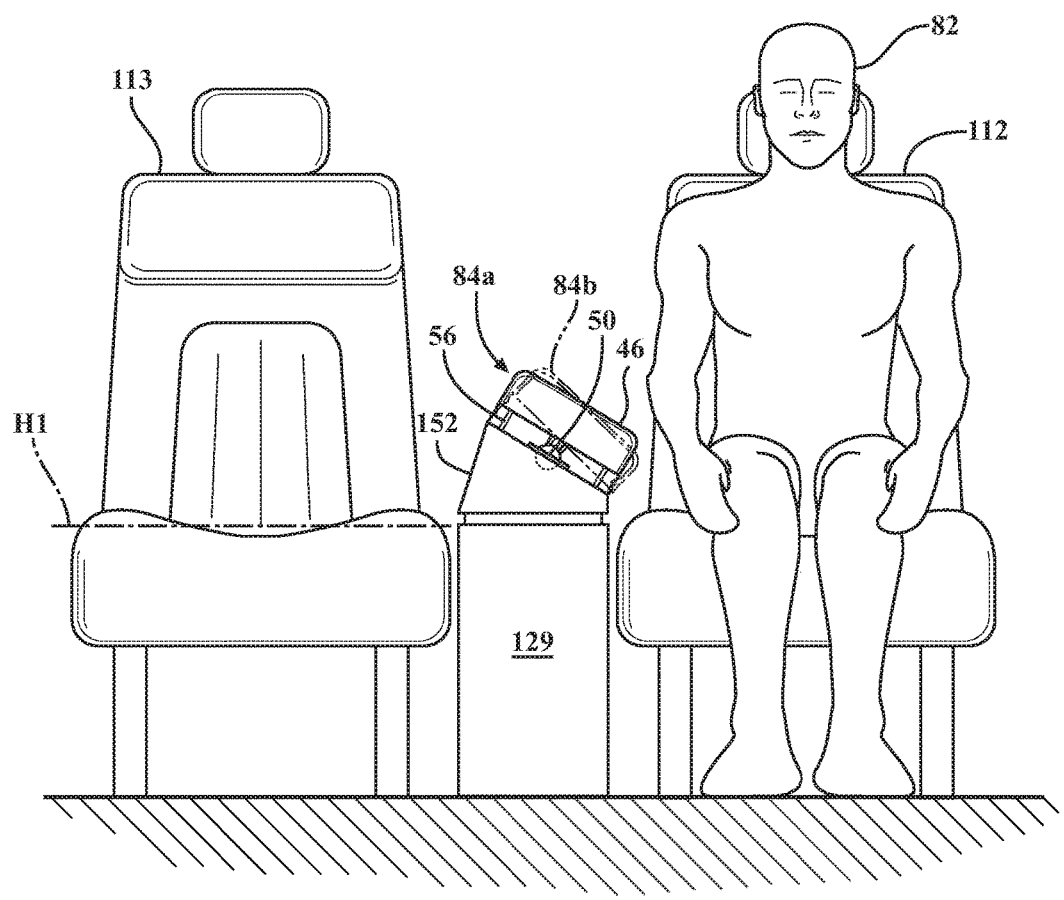
FIG. 8 is a schematic front view of an adjustable airbag system including an airbag housing orientation mechanism in accordance with an embodiment described herein.

Referring to FIG. 8, in one or more arrangements, the airbag housing orientation mechanism 26 may be permanently biased toward one of the driver's side and the front passenger's side, and the orientation mechanism may adjust the housing orientation to the particulars of an occupant on the selected side, as previously described. In the example shown, a mounting base 152 is structured to permanently bias the housing orientation toward one side. The orientation mechanism 26 then implements fine or detailed adjustments to the airbag housing orientation responsive to the vehicle occupant parameters.

For example, the airbag housing orientation mechanism 26 may automatically adjust the housing orientation to a first orientation 84a responsive to sensor information indicating that the occupant 82 is relatively taller, and that the occupant's torso resides relatively higher in the seat 112. The orientation 84a may be specified such that the airbag 48 will deploy so as to optimally cushion the torso of the relatively taller occupant when the airbag is deployed.

Similarly, the airbag housing orientation mechanism 26 may automatically adjust the housing orientation to a second orientation 84b (shown in phantom) responsive to sensor information indicating that the occupant 82 is relatively shorter, and that the occupant's torso resides relatively lower in the seat 112. The orientation 84b may be specified such that the airbag 48 will deploy so as to optimally cushion the torso of the relatively shorter occupant when the airbag is deployed.

Figure 10:
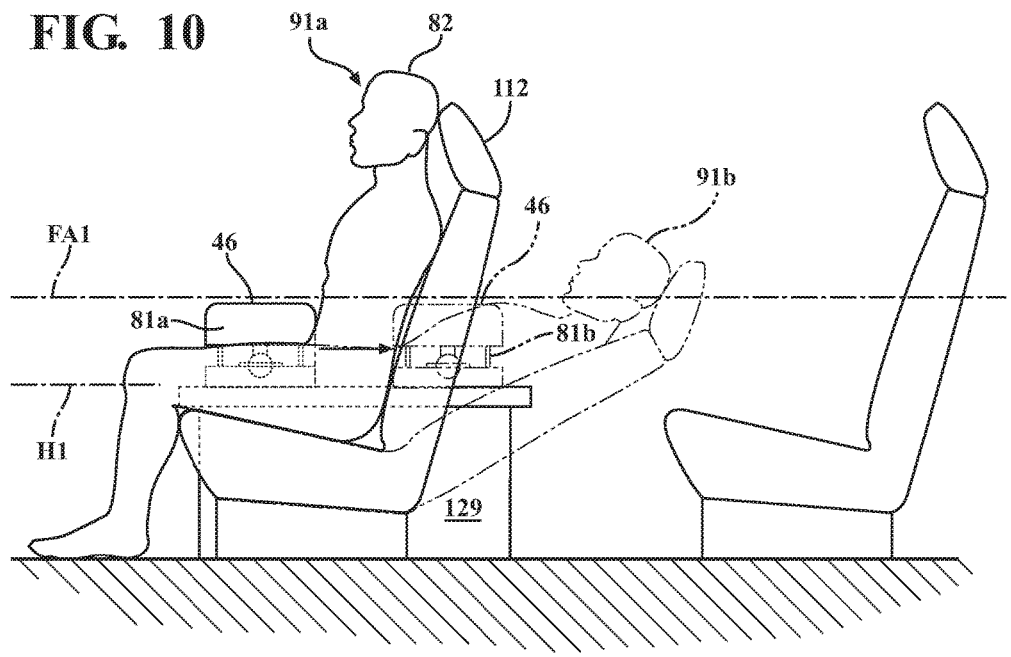
FIG. 10 is a schematic side view of an adjustable airbag system including airbag housing positioning mechanism and an airbag housing orientation mechanism configured to enable movement and orientation of an airbag housing responsive to a change in orientation of a seated occupant.

Referring to FIG. 10, in another example, the occupant 82 has reoriented from an upright orientation 91a to a reclined orientation 91b. Responsive to this change in orientation as detected by the sensors 124, the airbag housing positioning mechanism 28 may automatically move the airbag housing 46 from a location 81a to a location 81b closer to the reclined occupant's torso. In addition, the airbag housing orientation mechanism 26 may automatically adjust the orientation of the airbag housing responsive to the vehicle occupant parameters and prior to deployment of the airbag, so as provide a deployment more suitable for cushioning the occupant in the reclined orientation.

In the preceding detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An adjustable airbag system for a vehicle, the system comprising:
    an airbag assembly having an inflatable airbag within an airbag housing, and
    an airbag housing orientation mechanism operatively coupled to the airbag housing, the airbag housing orientation mechanism being structured to enable control of an orientation of the airbag housing so as to enable deployment of the airbag to cushion an occupant positioned in either one of a driver side or a front passenger side of the vehicle, the airbag housing orientation mechanism including at least a first shape memory alloy actuator coupled to the airbag housing at a first location, and at least a second shape memory alloy actuator coupled to the airbag housing at another location spaced apart from the first location,
    the airbag housing orientation mechanism being configured to enable rotation of the airbag housing by simultaneously heating one of the at least a first shape memory alloy actuator and the at least a second shape memory alloy actuator to a transformation temperature of a shape memory alloy material of the one of the at least a first shape memory alloy actuator and the at least a second shape memory alloy actuator, and heating the other one of the at least a first shape memory alloy actuator and the at least a second shape memory alloy actuator to a temperature within a superelastic temperature range of the shape memory alloy material of the other one of the at least a first shape memory alloy actuator and the at least a second shape memory alloy actuator.

2. The airbag system of claim 1 wherein the airbag housing orientation mechanism includes a mounting base, wherein the airbag housing is pivotably connected to the mounting base, and wherein the mounting base is structured to be coupled to a portion of the vehicle so as to be movable within a passenger compartment of the vehicle.

3. The airbag system of claim 2 wherein each of the at least a first shape memory alloy actuator and the at least a second shape memory alloy actuator operatively connects an associated portion of the airbag housing to the mounting base, each actuator being operable to control a distance between the associated portion of the airbag housing and the mounting base, and wherein the airbag housing orientation mechanism is structured to control an orientation of the airbag housing by controlling distances of the associated portions of the airbag housing from the mounting base using the at least a first shape memory alloy actuator and the at least a second shape memory alloy actuator.

4. The airbag system of claim 2 further comprising an airbag housing positioning mechanism structured to be operatively coupled to a portion of a vehicle, wherein the mounting base is structured to be coupled to the airbag housing positioning mechanism, and wherein the airbag housing positioning mechanism is structured to be operable to move the mounting base within the passenger compartment of a vehicle.

5. The airbag system of claim 4 wherein the airbag housing positioning mechanism is structured to be operable to move the mounting base in directions parallel to a fore-aft axis of a vehicle.

6. The airbag system of claim 5 wherein the airbag housing positioning mechanism comprises one or more rails oriented so as to move the mounting base in directions parallel to the fore-aft axis of the vehicle.

7. The airbag system of claim 4 wherein the airbag housing positioning mechanism is structured to be operable to move the mounting base in directions perpendicular to a fore-aft axis of the vehicle.

8. The airbag system of claim 4 further comprising:
at least one sensor configured to measure at least one vehicle occupant parameter;
a controller in operative communication with the airbag housing positioning mechanism and the at least one sensor; and
a controller in operative communication with the airbag housing orientation mechanism and the at least one sensor,
wherein the controller in operative communication with the airbag housing positioning mechanism and the at least one sensor is configured for operating the airbag assembly positioning mechanism to move the mounting base to a position for deployment of the airbag, responsive to a measurement of the least one vehicle occupant parameter and prior to deployment of the airbag, and
the controller in operative communication with the airbag housing orientation mechanism and the at least one sensor is configured for operating the airbag housing orientation mechanism to control an orientation of the airbag housing for airbag deployment, responsive to a measurement of a least one vehicle occupant parameter and prior to deployment of the airbag.

9. The airbag system of claim 2 wherein the portion of the vehicle is a center console positioned between a driver seat and a front passenger seat.

10. The airbag system of claim 2 wherein the airbag housing is pivotably connected to the mounting base by a ball joint.

11. The airbag system of claim 1 further comprising:
at least one sensor configured to measure at least one vehicle occupant parameter; and
a controller in operative communication with the airbag housing orientation mechanism and with the at least one sensor,
the controller being configured for operating the airbag housing orientation mechanism to control an orientation of the airbag housing responsive to a measurement of the at least one vehicle occupant parameter.

12. The airbag system of claim 1 wherein the airbag housing orientation mechanism and airbag housing positioning mechanism are configured to enable automatic control of an orientation and position of the airbag housing so as to enable deployment of the airbag to cushion an occupant positioned in a rear seat of the vehicle.

13. An adjustable airbag system for a vehicle, the system comprising:
an airbag assembly having an inflatable airbag within an airbag housing, and
an airbag housing orientation mechanism operatively coupled to the airbag housing, the airbag housing orientation mechanism being structured to enable control of an orientation of the airbag housing so as to enable deployment of the airbag to cushion an occupant positioned in either one of a driver side or a front passenger side of the vehicle,
wherein the airbag housing orientation mechanism includes a mounting base, wherein the airbag housing is pivotably connected to the mounting base,
the adjustable airbag system further comprising an airbag housing positioning mechanism structured to be operatively coupled to a portion of a vehicle, wherein the mounting base is structured to be coupled to the airbag housing positioning mechanism, wherein the airbag housing positioning mechanism is structured to be operable to move the mounting base in directions perpendicular to a fore-aft axis of the vehicle, and
wherein the airbag housing positioning mechanism comprises an x-y positioning stage.

14. The airbag system of claim 13 wherein the airbag housing orientation mechanism and airbag housing positioning mechanism are structured to enable automatic control of an orientation and position of the airbag housing so as to enable deployment of the airbag to cushion an occupant positioned in a rear seat of the vehicle.

15. An adjustable airbag system for a vehicle, the adjustable airbag system comprising:
an airbag housing including an inflatable airbag mounted therein;
an airbag housing orientation mechanism operatively coupled to the airbag housing and structured to enable control of an orientation of the airbag housing; and
an airbag housing positioning mechanism structured to be operatively coupled to a portion of a vehicle, wherein the airbag housing is structured to be coupled to the airbag housing positioning mechanism, wherein the airbag housing positioning mechanism is operable to move the airbag housing within a space between a driver seat and a front passenger seat,
and wherein the airbag housing positioning mechanism comprises an x-y positioning stage.

16. The airbag system of claim 15 wherein the airbag housing orientation mechanism includes one or more actuators and a mounting base, each actuator operatively connecting an associated portion of the airbag housing to the mounting base, each actuator being operable to control a distance between the associated portion of the airbag housing and the mounting base, and wherein the airbag housing orientation mechanism is structured to control a spatial orientation of the airbag housing by controlling the distances of the associated portions of the airbag housing from the mounting base using the one or more actuators.

17. The airbag system of claim 15 wherein the airbag housing positioning mechanism is structured to be operable to move the airbag housing in directions parallel to a fore-aft axis of a vehicle.

18. The airbag system of claim 17 wherein the airbag housing positioning mechanism is structured to be operable to move the airbag housing in directions perpendicular to the fore-aft axis of the vehicle.

19. The airbag system of claim 15 wherein the airbag housing orientation mechanism is structured to enable control of an orientation of the airbag housing so as to enable deployment of the airbag to cushion an occupant positioned in either one of a driver side or a front passenger side of a vehicle.

20. The airbag system of claim 15 wherein the airbag housing orientation mechanism includes a mounting base, and wherein the airbag housing is rotatably connected to the mounting base.

21. The airbag system of claim 15 further comprising:
at least one sensor configured to measure at least one vehicle occupant parameter;
a controller in operative communication with at least the airbag housing orientation mechanism and the at least one sensor; and
a controller in operative communication with at least the airbag housing positioning mechanism and the at least one sensor,
wherein the controller in operative communication with at least the airbag housing orientation mechanism and the at least one sensor is configured for operating the airbag housing orientation mechanism to control an orientation of the airbag housing responsive to a measurement of the least one vehicle occupant parameter and prior to deployment of the airbag, and
the controller in operative communication with at least the airbag housing positioning mechanism and the at least one sensor is configured for operating the airbag housing positioning mechanism to move the airbag housing to a position for deployment of the airbag, responsive to the measurement of the least one vehicle occupant parameter and prior to deployment of the airbag.

22. The adjustable airbag system of claim 15, wherein the airbag housing orientation mechanism includes at least one first shape memory alloy actuator coupled to a first side of the housing, and at least one second shape memory alloy actuator coupled to a second side of the housing opposite the first side, wherein the airbag housing orientation mechanism is configured to enable rotation of the housing by simultaneously heating of both the first and second shape memory alloy actuators.

23. The airbag system of claim 15 wherein the airbag housing orientation mechanism and airbag housing positioning mechanism are configured to enable automatic control of an orientation and position of the airbag housing so as to enable deployment of the airbag to cushion an occupant positioned in a rear seat of the vehicle.

* * * * *